United States Patent Office

Re. 25,544
Reissued Mar. 31, 1964

25,544

1,1,1-TRIFLUORO-2-BROMO-2-CHLOROETHANE AND A PROCESS OF MAKING IT

Charles Walter Suckling, Widnes, and James Raventos, Blackley, England, assignors to Imperial Chemical Industries Limited, London, England, a corporation of Great Britain No Drawing. Original No. 2,849,502, dated Aug. 26, 1958, Ser. No. 539,689, Oct. 10, 1955. Application for reissue Oct. 26, 1959, Ser. No. 850,012
Claims priority, application Great Britain Oct. 20, 1954
5 Claims. (Cl. 167—52)

Matter enclosed in heavy brackets [ ] appears in the original patent but forms no part of this reissue specification; matter printed in italics indicates the additions made by reissue.

This invention provides a new halohydrocarbon, useful as an inhalation anaesthetic and methods of making the same. The compound in question is 1:1:1-trifluoro-2-bromo-2-chloroethane of the formula $CF_3$—CHBrCl. It is a colorless liquid of B.P. 50.2° C. at 760 mm., refractive index at 20° C. $n_D^{20}=1.3700$ and density 1.86 g/ml. at 22° C. It is stable to light when stored in amber colored bottles and its mixtures with oxygen in proportions ranging from 2 volumes to 200 volumes of oxygen per volume of trifluorobromochloroethane are non-inflammable when tested under conditions similar to those described in Report R.I. 3648 published by the United States Bureau of Mines in June 1942 and entitled "Limits of Inflammability and Ignition Temperature of Ethyl Mercaptan in Air." The compound is also stable in contact with soda-lime and so can be used in closed circuit or to-and-fro anaesthetic apparatus.

No satisfactory inhalation anaesthetic is available that will give full surgical anaesthesia. Of those currently in use, chloroform is obsolescent because it can give rise to permanent damage of the liver and heart; ether, divinyl ether, ethylene and cyclopropane have the serious defect of forming explosive mixtures with oxygen, trichloroethylene is more properly regarded as an analgesic rather than an anaesthetic; and nitrous oxide, which must be administered in very high concentration does not give sufficient depth of anaesthesia for most operations and consequently is seldom used for operations lasting much longer than 1½ minutes except in combination with, for example, ether, or supplemented by for example, concurrent administration of barbiturates.

It has now been found that 1:1:1-trifluoro-2-bromo-2-chloroethane is a particularly useful non-explosive inhalation anaesthetic capable of producing full surgical anaesthesia over prolonged periods.

In an article in the Journal of Pharmacology and Experimental Therapeutics, 1946, vol. 86, p. 197, Robbins described an investigation of the anaesthetic activity of a group of fluorinated hydrocarbons, including a number of fluoroethanes, fluoropropanes and fluorobutanes showing some points of chemical relationship with the compound the subject of the present invention. He concluded that the compounds became more potent and less likely to produce convulsions as the boiling point increased, that further substitution by chlorine or, more markedly, by bromine considerably increased their potency, that the dibromo and dichloro substituted fluorohydrocarbons are more potent than their monosubstituted homologues and that only the bromofluorohydrocarbons have margins of safety greater than ether or chloroform. As a result of a more detailed study of eighteen selected compounds, he concluded that four, namely $CF_3$—CHBr—$CH_3$, $CF_3$—$CHBr_2$, $CF_3$—CHCl—$CH_2Cl$ and $CHF_2$—CHCl—$CH_3$, were the most promising and merited further investigation as potential inhalation anaesthetics.

Of these four compounds, the third and fourth are difficult to prepare on a commercial scale, while further investigation of the first and the second shows, in our experience, that neither is likely to be a successful anaesthetic because in tests with rabbits $CF_3$—CHBr—$CH_3$ produces serious cardiac irregularities, while $CF_3$—$CHBr_2$ produces an excessive fall in blood pressure.

On the other hand, in preliminary studies in rabbits, dogs and monkeys, we have found that 1:1:1-trifluoro-2-bromo-2-chloroethane gives an exceptionally smooth and rapid induction to full surgical anaesthesia which can be maintained by inhalation of a relatively small concentration of vapor in air, for example, a concentration of 0.4%–0.8% by volume, the depth of anaesthesia being readily controlled. The concentrations of chloroform (1.5%–2%) and of ether (3%–3.5%) needed for the maintenance of anaesthesia are considerably higher. Recovery from anaesthesia with our new compound is rapid and smooth, no undesirable sequelae have been observed in, for example, kidney and liver functions after anaesthesia for as much as 5 hours, there is a total absence of cardiac irregularities as displayed by the electrocardiogram. Damage to kidney and liver is apparent after only 1–2 hours inhalation of chloroform. After inhalation by rabbits of the compound of our invention during one hour in concentration above that necessary to induce anaesthesia in less than 5 minutes, namely 2.5%–3.5%, the blood pressure fell to 50–70% of the normal value but returned to its original value shortly after the vapor concentration was decreased or its administration discontinued. Very little depression of the blood pressure was observed during the inhalation of maintenance concentrations of our new compound. After inhalation for one hour of merely maintenance concentrations of the compound $CF_3CHBrCH_3$ the blood pressure fell to 50–70% of the normal value and with equiactive concentrations of the compound $CF_3CHBr_2$ it fell to 25–30% of the normal value. Moreover, with these compounds, as with chloroform and cyclopropane, cardiac irregularities are visibly displayed on the electrocardiogram.

The margin of safety of 1:1:1-trifluoro-2-bromo-2-chloroethane measured in mice by the LC50/AC50 ratio (LC50 being the minimum concentration, by volume, of vapor needed to kill 50% of test mice in 30 minutes and AC50 being the minimum concentration by volume needed to produce full anaesthesia in 50% of the test mice in the same time) is 3.5. Under the same conditions the LC50/AC50 ratio of ether is 1.77, that of chloroform is 1.75, that of the compound $CF_3CHBrCH_3$ is 3.3 and that of the compound $CF_3CHBr_2$ is 2.5. The margin of safety is also evident from estimations of the concentration of the compound in the blood of test animals. At light anaesthesia the concentration is 5.0–7.0 mg. percent; at deep surgical anaesthesia it is 18–25 mg. percent; at respiratory arrest it is as high as 35–45 mg. percent.

From a consideration of the physical and chemical properties of some already known compounds closely chemically related to 1:1:1-trifluoro-2-bromo-2-chloroethane, coupled with the observations of Robbins, one could perhaps predict that this latter compound would function in some degree as a non-explosive inhalation anaesthetic. One could not, however, predict that it would show the advantageous margin of safety, smooth and rapid induction, ease of control and freedom from side reactions that our preliminary studies have so far revealed.

A further feature of the invention is the preparation of the compound by either of two alternative methods now to be described.

According to the first method the compound is made by direct bromination of 1:1:1-trifluoro-2-chloroethane.

This later compound can itself be made, as is already known, by the action of hydrogen fluoride in the presence of antimony pentachloride on asymmetrical tetrachloroethane, which in turn is conveniently made either by the action of hydrogen chloride on trichloroethylene or by direct chlorination of asymmetrical dichloroethylene. Another method of making the intermediate 1:1:1-trifluoro-2-chloroethane is to chlorinate 1:1:1-trifluoroethane, itself obtained by fluorination of 1:1:1-trichloroethane with hydrogen fluoride in presence of antimony pentachloride. The bromination of 1:1:1-trifluoro-2-chloroethane is preferably conducted in the gaseous phase at elevated temperature and is conveniently carried out by passing a mixture of this compound and bromine through a silica tube at elevated temperature. Efficient conversions have been attained at temperatures in the range 425°–475° C. With a molar ratio of the trifluoro-chloroethane to bromine in the range 1.5:1 to 2:1. The reaction will proceed at temperatures as low as 350° C. but the degree of conversion is then low, much of the trifluoro-chloroethane remaining unchanged. Higher temperatures, e.g. of the order of 600° C. should be avoided as they lead to the formation of more highly brominated compounds and compounds in which chlorine has been replaced by bromine. Increase of the ratio of trifluoro-chloroethane to bromine has an effect similar to that produced by lowering the temperature; diminishing the ratio, if carried too far, leads to overbromination and replacement of chlorine by bromine.

An alternative method of making the 1:1:1-trifluoro-2-bromo-2-chloroethane is to chlorinate 1:1:1-trifluoro-2-bromo-ethane, which compound is itself conveniently obtained by the action of hydrogen fluoride in the presence of antimony pentachloride on 1:1-dichloro-1:2-dibromoethane, which in turn is made by direct bromination of asymmetrical dichloroethylene. Alternatively the 1:1:1-trifluoro-2-bromoethane can be made by bromination of 1:1:1-trifluoroethane, itself obtained, as indicated above, by fluorination of 1:1:1-trichloroethane. The chlorination of the 1:1:1-trifluoro-2-bromoethane is preferably conducted in the gaseous phase at elevated temperature and is conveniently carried out by passing a mixture of this compound and chlorine through a silica tube heated to 380° C. Reactions carried out at higher temperatures gave larger proportions of the dichloro compound and led to some replacement of chlorine by bromine. Lower temperatures gave lower yields and less complete conversion. The temperatures should advisedly be in the range 300°–475° C., preferably 350°–400° C. and the molar ratio of trifluorobromoethane to chlorine in the range 5:1 to 1:1, preferably in the range 3:1 to 2:1.

The manufacture of the new compound is illustrated by the following examples which, however, must not be regarded as in any way limiting the invention.

EXAMPLE I

The apparatus used consisted of a 2" x 24" silica tube packed with silica chips and enclosed in a vertical electric furnace. 1:1:1-trifluoro-2-chloroethane as vapor and bromine as liquid were introduced into a narrow tube passing down the inside of the reaction tube. The mixed reactants then passed up through the reaction tube which was maintained at a temperature of about 465° C. The reaction products were passed through a water-cooled condenser which condensed out most of the desired 1:1:1-trifluoro-2-bromo-2-chloroethane along with any high boiling by-products and unchanged bromine. This condensate was washed with dilute caustic soda solution and dried over calcium chloride. The exit gases from this condenser were scrubbed with water and dilute caustic soda solution, dried and passed to a condenser cooled with a mixture of solid carbon dioxide and trichloroethylene which caused the unchanged 1:1:1-trifluoro-2-chloroethane to condense. This second condensate was then combined with the first and the mixture was fractionally distilled.

During a run of 2 hours 620 g. of 1:1:1-trifluoro-2-chloroethane and 630 g. of bromine were fed to the reactor and the product was worked up as described above. On fractional distillation there was obtained a first cut up to 50° C. consisting substantially of unchanged 1:1:1-trifluoro-2-chloroethane, then a middle cut between 50° C. and 52° C. consisting of substantially pure 1:1:1-trifluoro-2-bromo-2-chloroethane and a higher boiling residue that contained a further quantity of the desired product together with some 1:1:1-trifluoro-2:2-dibromo-2-chloroethane. On re-distillation of the middle fraction pure 1:1:1-trifluoro-2-bromo-2-chloroethane was obtained with B.P. 50–50.5° C.

EXAMPLE II

Bromine was vaporized and passed upwards at the rate of 311 g. per hour, together with 1:1:1-trifluoro-chloroethane at the rate of 451 g. per hour, through a furnace consisting of a silica tube 2" in diameter and 6' long, 3' of which was packed with silica chips and heated to 427° C. The mixed vapors from the head of the furnace were introduced at the appropriate level in a continuous still designed and operated so that hydrogen bromide passed away at the head of the still, while unchanged bromine, unchanged trifluoro-chloroethane and the organic reaction products collected in the boiler which was held at 22° C. The boiler contents continuously overflowed and were led at the appropriate level into a second continuous still operated so that unchanged trifluoro-chloroethane was stripped out. The organic reaction products and unchanged bromine were then continuously withdrawn from the second still boiler (held at 54°–55° C.) and passed to continuous washing and separating devices where they were washed first with aqueous 10% sodium hydroxide solution and then with water. Finally the product was dried and distilled, the fraction boiling at 50.2° C. at 760 mm. being collected.

During a run of 17 hours 50 minutes 5560 g. of bromine and 8050 g. of trifluoro-chloroethane were introduced into the system. 5250 g. of crude 1:1:1-trifluoro-2-bromo-2-chloroethane were obtained and 4670 g. of trifluoro-chloroethane were recovered unchanged. Fractionation of the crude product gave 4120 g. of pure 1:1:1-trifluoro-2-bromo-2-chloroethane, which represents a yield of 73.2% based on the trifluoro-chloroethane consumed.

EXAMPLE III

1:1:1-trifluoro-2-bromoethane (3 molar proportions) and chlorine (1 molar proportion) were passed in the gaseous state through a silica tube heated to 380° C., the "contact time" (i.e. the ratio of the volume of the heated zone to the rate of flow of the gas mixture measured in volumes per second) being 18 seconds. The reaction products were condensed in a vessel cooled with a mixture of solid carbon dioxide and trichloro-ethylene. The liquid was washed first with aqueous 10% sodium hydroxide solution, then with water, dried and fractionated. 1:1:1-trifluoro-2-bromo-2-chloroethane of B.P. 50°–50.5° C. and refractive index $n_D^{20}$ 1.3700 was obtained in a yield corresponding to 54% of the trifluoro-bromoethane consumed. The proportion of this latter compound converted to the chloro derivative in a single passage through the heating zone was 26%.

Similar reactions carried out at higher temperatures gave larger proportions of over-chlorinated compounds and compounds wherein the bromine was replaced by chlorine. Lower temperatures gave lower yields and also lower conversion rates.

Increase in the ratio of chlorine to the organic starting material gave higher conversion rates but lower yields owing to over-chlorination and some replacement of bromine by chlorine.

We claim:

1. The new chemical compound 1:1:1-trifluoro-2-bromo-2-chloroethane.

2. Process for the manufacture of 1:1:1-trifluoro-2-bromo-2-chloroethane which comprises chlorinating 1:1:1-trifluoro-2-bromoethane with chlorine in the gaseous phase at a temperature from about 300° to 475° C. and wherein the molar ratio of said 1:1:1-trifluoro-2-bromoethane to said chlorine is from about 5:1 to 1:1.

3. Process for the manufacture of 1:1:1-trifluoro-2-bromo-2-chloroethane which comprises chlorinating 1:1:1-trifluoro-2-bromoethane with chlorine in the gaseous phase at a temperature from about 350° to about 400° C. and the molar ratio of said 1:1:1-trifluoro-2-bromoethane to said chlorine is from about 3:1 to 2:1.

*4. A respirable gaseous anaesthetic mixture comprising 1:1:1-trifluro-2-bromo-2-chloroethane in admixture with oxygen as the essential active ingredients, said oxygen being present in a proportional amount proper for respiratory purposes.*

*5. In a method for inducing anaesthesia in a living mammal, the improvement which comprises administering to said living mammal an anaesthetizing amount of 1:1:1-trifluoro-2-bromo-2-chloroethane.*

References Cited in the file of this patent or the original patent

UNITED STATES PATENTS

| | | |
|---|---|---|
| 2,644,845 | McBee | July 7, 1953 |
| 2,658,928 | Simons et al. | Nov. 10, 1953 |
| 2,729,687 | Sterling | Jan. 3, 1956 |

OTHER REFERENCES

Robbins: Journal of Pharmacology and Experimental Therapeutics, 86, pp. 197–204 (1946).

Simons: Fluorine Chemistry, vol II, page 405 (1954).